United States Patent
Gacon et al.

(10) Patent No.: US 10,430,652 B2
(45) Date of Patent: Oct. 1, 2019

(54) PROCESS AND SYSTEM FOR VIDEO SPOOF DETECTION BASED ON LIVENESS EVALUATION

(71) Applicant: MORPHO, Issy-les-Moulineaux (FR)

(72) Inventors: Pierre Gacon, Issy les Moulineaux (FR); Christoph Busch, Darmstadt (DE); Kiran Bylappa Raja, Darmstadt (DE); Ramachandra Raghavendra, Gjovik (NO)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 43 days.

(21) Appl. No.: 15/542,913

(22) PCT Filed: Jan. 13, 2015

(86) PCT No.: PCT/IB2015/001534
§ 371 (c)(1),
(2) Date: Jul. 11, 2017

(87) PCT Pub. No.: WO2016/113587
PCT Pub. Date: Jul. 21, 2016

(65) Prior Publication Data
US 2018/0012059 A1   Jan. 11, 2018

(51) Int. Cl.
*G06K 9/00* (2006.01)

(52) U.S. Cl.
CPC ....... *G06K 9/0061* (2013.01); *G06K 9/00906* (2013.01)

(58) Field of Classification Search
CPC .. G06K 9/0061; G06K 9/00906; G06F 21/32; G06F 21/316; H04L 63/0861
(Continued)

(56) References Cited

U.S. PATENT DOCUMENTS 8,437,513 B1   5/2013 Derakhshani et al.
9,716,791 B1 *  7/2017 Moran ............... H04M 3/5175
(Continued)

OTHER PUBLICATIONS

Anjos, a., et al., "Counter-Measures to Photo Attacks in Face Recognition: a public database and a baseline," IEEE—International Joint Conference on Biometrics, 7 pages (2011).
(Continued)

*Primary Examiner* — Charlotte M Baker
(74) *Attorney, Agent, or Firm* — Womble Bond Dickinson (US) LLP (57) ABSTRACT

The invention presents a process for determining a video as being a spoof or a genuine recording of a live biometric characteristic, characterized in that it comprises the steps of:
  preprocessing (200) the video,
  determining a liveness score (300) of the video, said determination comprising, for each frame of a plurality of frames (j) of the video:
    computing a difference between a motion intensity of a current frame and that of each frame of a set of preceding frames to infer a differential motion intensity of the current frame,
    inferring (330), from the differential motion intensities of the plurality of frames, a motion intensity of the video,
    comparing (340) said motion intensity to a predetermined threshold, and assigning a liveness score to the video, and
  determining (400) whether the video is a genuine recording of a biometric characteristic or a spoof.

15 Claims, 4 Drawing Sheets

(58) Field of Classification Search
USPC .................................................. 382/117
See application file for complete search history.

(56) References Cited

U.S. PATENT DOCUMENTS

2011/0007949 A1    1/2011  Hanna et al.
2017/0032114 A1*   2/2017  Turgeman .............. G06F 21/32

OTHER PUBLICATIONS

Bharadwaj, S., et al., "Computationally Efficient Face Spoofing Detection with Motion Magnification," IEEE Conference on Computer Vision and Pattern Recognition Workshops, pp. 105-110 (2013).
Choi, I., et al., "Eye Detection and Eye Blink Detection using AdaBoost Learning and Grouping," Computer Communications and Networks (ICCCN), Proceedings of 20$^{th}$ International Conference, pp. 1-4 (Jul. 31-Aug. 4, 2011).
Lee, W.O., et al., "Blink detection robust to various facial poses," Journal of Neuroscience Methods, vol. 193, pp. 356-372 (2010).
Li, J., "Eye Blink Detection Based on Multiple Gabor Response Waves," Machine Learning and Cybernetics, vol. 5, No. 30, pp. 2852-2856 (Jul. 12-15, 2008).
Liu, C., et al., "Motion Magnification," CSAIL Research Abstracts, 2 pages (2005).
MORPHO, "International Search Report," PCT Application No. PCT/IB2015/001534 dated Dec. 7, 2015.
Wadhwa, N., et al., "Phase-Based Video Motion Processing," ACM Trans. Graph., vol. 32, No. 4, Article 80, 10 pages (Jul. 2013).
Wang, J., et al., "The Cartoon Animation Filter," ACM Trans. Graph., vol. 25, pp. 1169-1173 (2006).
Wu, H., et al., "Eulerian Video Magnification for Revealing Subtle Changes in the World," ACM Trans. Graph., vol. 31, No. 4, pp. 1-8 (Jul. 1, 2012).

* cited by examiner

PROCESS AND SYSTEM FOR VIDEO SPOOF DETECTION BASED ON LIVENESS EVALUATION

TECHNICAL FIELD OF THE INVENTION

The invention relates to the field of processes for discriminating between genuine and spoof videos of biometric characteristics, and applies in particular to the detection of spoof of the replay video type.

The invention can be implemented in a context of identification or authentication for giving access to a secure zone or allowing a secure transaction.

BACKGROUND ART

Numerous controls rely on authentication or identification based on biometric characteristics, for instance to allow an individual to access a secure place or to proceed with a secure transaction.

Some controls are implemented by recording a video of a biometric characteristic (e.g. iris) of an individual, and comparing the extracted biometric features to a database of recorded individuals to find a match.

To fool such a control, attacks have been developed in which an imposter uses a stolen biometric sample from a database to gain access to the secured zone or is allowed to perform the transaction.

These attacks (i.e. presentation attacks) can take the form of a print attack, in which a biometric sample is printed using high quality laserjet or inkjet printer, and used during the control process. Therefore during the control, a video of the print, instead of the genuine biometric characteristic, is recorded.

Attacks can also take the form of a replay video attack, in which a high quality electronic video displaying a biometric sample is used during the control process. In that case, the control system records a new video of the displayed video instead of the biometric characteristic.

A control system should be able to detect such presentation attacks in order to be secure and reliable, and thus should be able to determine the liveness of the subject of the recording (either a genuine biometric characteristic, or a replay video, or a print of the biometric sample).

A process for detecting presentation attacks on face recognition capture devices has been proposed in the document of S. Bharadwaj, T. I. Dhamecha, M. Vatsa and R. Singh, *Computationally efficient face spoofing detection with motion magnification*, in 2013 IEEE Conference on Computer Vision and Pattern Recognition Workshops, pages 105-110, IEEE, 2013.

This process relies on using magnitude of motion magnification and texture descriptors, and is therefore not adapted for other kinds of biometric characteristics such as, for instance, irises that are relied upon on replay video attacks.

Therefore there is a need for a process allowing detection of replay video attacks in iris recognition.

SUMMARY OF THE INVENTION

One aim of the invention is to provide a process for determining a video as being a spoof or a genuine record of a biometric characteristic, no matter which type of biometric characteristic is the subject of the video.

Accordingly, an object of the invention is a process for determining a video of a biometric characteristic as being a spoof or a genuine recording of a live biometric characteristic, wherein the video comprises a temporal sequence of frames, the process being implemented in a system comprising a processing unit, characterized in that it comprises the steps of:

preprocessing the video, said preprocessing comprising aligning the biometric characteristic on each frame of the video, determining a liveness score of the video, said determination comprising, for each frame of a plurality of frames:
  computing a difference between a motion intensity of a current frame and a motion intensity of each frame of a set of preceding frames,
  inferring, from said differences, a differential motion intensity of the current frame,
  inferring from the differential motion intensities of the plurality of frames a motion intensity of the video,
  comparing said motion intensity to a predetermined threshold, and assigning a liveness score to the video, depending on the
  comparison of the motion intensity of the video with the threshold, and according to the liveness scores of the video, determining whether the video is a genuine recording of a biometric characteristic or a spoof.

In some embodiments, the process can comprise at least one of the following features: The motion intensity of a frame comprises phase variation of the frame, and motion intensity of the video comprises phase variation of the video.

The motion intensity of the video is inferred from differential motion intensities of at least ten frames of the video.

The set of frames for computation of the motion intensity difference with the current frame comprises from three to eight frames, and preferably five frames preceding the current frame.

Each frame is divided into non-overlapping blocks of constant size, and the computation of the difference in motion intensity between two frames is carried out by computing, for every block in the current frame, the difference between a motion intensity of the block and a motion intensity of a corresponding block of each of the set of previous frames, and the differential motion intensity of the current frame is obtained by:
  electing, for each block of the current frame, the maximum motion intensity difference between said block and the corresponding block of each of the set of previous frames, and
  summing the maximum motion intensities of all the blocks in the frame.

the preprocessing step further comprises a step of magnifying the motion in the video.

The motion magnification is a phase-variation magnification and comprises:
  decomposing the video using a Fast Fourier Transform,
  applying a bandpass filter to the phase,
  applying an amplification factor to at least some phase components, and
  implementing an inverse Fourier Transform to reconstruct the video.

The biometric characteristic on the video is an iris, and the preprocessing of the video comprises selecting (230) frames of the video to remove blinks of the eye.

The process further comprises comparing the motion intensity of the video to a second threshold, and the step of assigning a liveness score to the video depends on the comparison of the motion intensity with the two thresholds.

The differential motion intensity of each frame is further normalized by applying a sigmoid function to it.

The motion intensity of the video is the mean of the normalized differential intensities, and said motion intensity is compared to the first threshold and, if it exceeds said threshold, the video is considered as being a spoof of the replay video type, and the liveness score assigned to the frame is 0.

The second threshold is lower than the first threshold, the motion intensity of the video is compared to the second threshold, and, if below said threshold, the video is considered as being a spoof of the print type and the liveness score assigned to the frame is 0.

Another objet of the invention is a computer program product, comprising software code adapted to perform the process according to the preceding introduction when implemented by a processing unit.

Another object of the invention relates to a processing unit that it is configured to implement the process according to the preceding introduction.

Another object of the invention relates to an authentication or identification system, comprising a processing unit adapted to implement the above-mentioned process and a video camera adapted to acquire a video of a biometric characteristic, and to transfer said video to the processing unit.

The process according to the invention makes it possible to differentiate between a replay video attack and a genuine recording of a biometric characteristic, by assessing a motion intensity in the video.

Indeed, the replay video attack has more frequency components than in a true recording of a biometric characteristic. Therefore if a motion intensity in a video is more important than average, the video can be considered as a spoof video.

The process is particularly robust when the assessed motion intensity of the video is a phase variation of the video.

Furthermore, the decomposition of the video frames into blocks makes the process more robust.

BRIEF DESCRIPTION OF THE DRAWINGS

The features and advantages of the invention will be apparent from the following more detailed description of certain embodiments of the invention and as illustrated in the accompanying drawings, in which.

DETAILED DESCRIPTION OF AT LEAST AN EMBODIMENT OF THE INVENTION

System for Authentication or Identification

Figure 1:
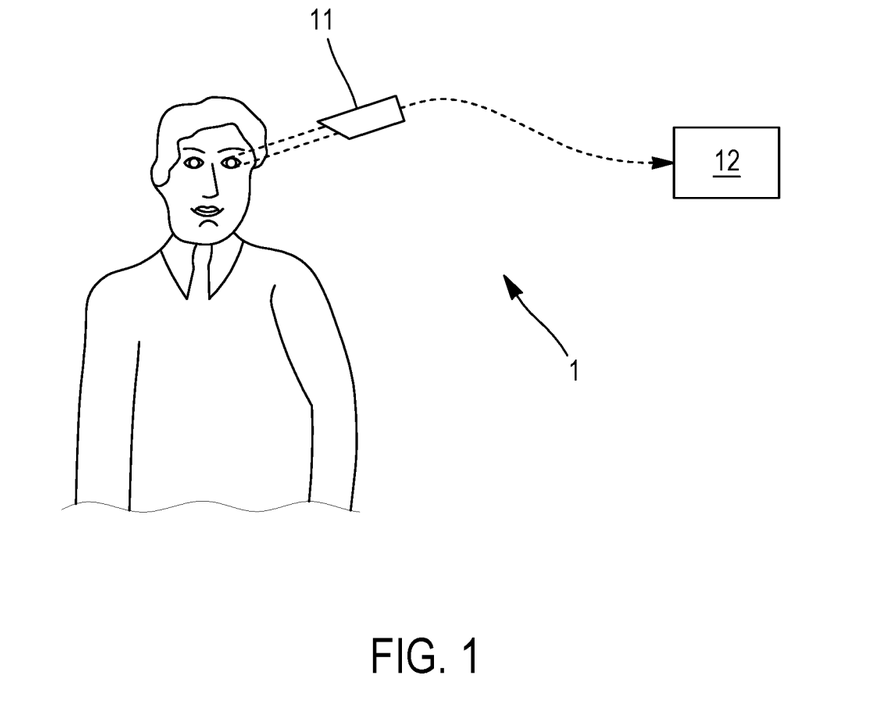
FIG. 1 schematically shows an authentication or identification system adapted to perform a process according to an embodiment of the invention.

With reference to FIG. 1, a system 1 for authentication or identification of an individual is shown. This system is preferably used for controlling access rights, for instance of individuals wishing to enter a secured zone.

The system 1 comprises a video camera 11 and a processing unit 12, connected, either by a wire or wirelessly, to the video camera in order to receive video recordings from said camera. In an embodiment, the system is integrated in a portable device such as a smartphone, a tablet or the like. In another embodiment, the video camera can be remote from the processing unit, for instance in an installation where the camera is at the entrance of a secured zone and the processing unit is in a separate room.

The video camera 11 is acquired to record a video recording of a biometric characteristic, however it needs not be of very high resolution. For instance a video camera of a smartphone usually has a sufficient resolution for carrying out the following process.

In the following, a video is considered to be a temporal sequence of a plurality of N frames of equal size (number of pixels).

The processing unit 12 has computational means and is adapted to perform the process disclosed hereinafter, through implementation of proper software code.

As explained before, the system 1 is supposed to record a video of a live biometric characteristic of an individual, but may undergo an attack, for instance of the replay video type, in which the video camera 11 records a video of a display of a video of a biometric characteristic, or of the print attack type, in which the video camera 11 records a video of an image of a biometric characteristic printed on a support medium (i.e. high quality paper).

Spoof Detection Process

Figure 2A:
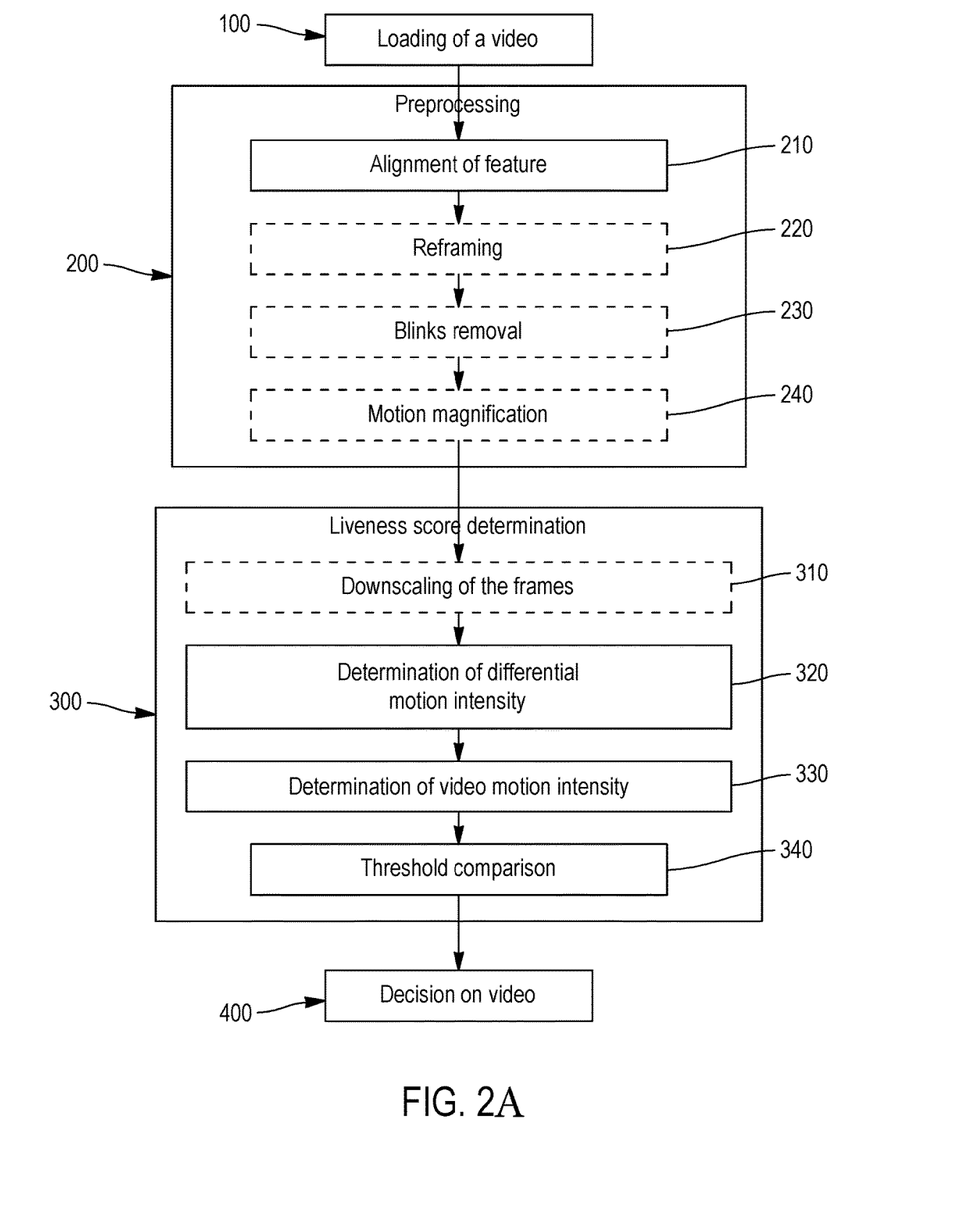
FIG. 2a schematically shows the main steps of the process according to an embodiment of the invention.

With reference to FIG. 2a, a process for determining whether a video is a spoof or a genuine recording of a live biometric characteristic will be described.

The first step 100 is the loading, by the processing unit 12, of a video to assess. This video may have been recorded by the camera 11 and either transmitted directly to the unit 12 or stored in a database or memory of the system for latter loading.

Pre-Processing

The process then comprises a pre-processing step 200 of the video.

The pre-processing comprises aligning 210 the biometric sample on each frame of the video, if the object that has been recorded has moved during the record.

Furthermore, each frame may also be reframed 220 in order to only keep on the frame the region of the biometric characteristic.

The biometric characteristic can be of various types: iris, shape of the face, pattern of blood vessels, etc., however, the process is preferably carried out on irises.

If the recorded biometric characteristic is an iris, then the preprocessing also comprises removing 230 frames corresponding to the blink of the eye, in order to keep only those frames in which the eye is fully open and the iris pattern is visible.

The blink removal can be done manually. Alternatively, blinks can be automatically detected and removed, for instance implementing the method disclosed in:

Jiang-Wei Li, "Eye blink detection based on multiple Gabor response waves," Machine Learning and Cybernetics, 2008 International Conference on, vol. 5, 30 no., pp. 2852, 2856, 12-15 Jul. 2008, Inho Choi; Seungchul Han; Daijin Kim, "Eye Detection and Eye Blink Detection Using AdaBoost Learning and Grouping," Computer Communications and Networks (ICCCN), 2011 Proceedings of 20th International Conference on, vol., no., pp. 1, 4, Jul. 31, 2011-Aug. 4, 2011, Lee, Won Oh, Eui Chul Lee, and Kang Ryoung Park. "Blink detection robust to various facial poses." Journal of neuroscience methods 193.2 (2010): 356-372.

The video may contain, after removal of the frames where the eye blinks, about thirty or more frames. Preferably, the video comprises at least fifteen frames, in order to properly carry out the remainder of the process.

Optionally, but preferably, the preprocessing may also comprise an additional step 240 of magnifying the motion in each frame of the video.

This step may preferably be implemented by magnifying phase variation in the video. To this end, frequency transformation techniques such as Fast Fourier Transform may be implemented to decompose the video and separate the amplitude from the phase.

Then, a bandpass filter is applied to the phase to remove any temporal DC component. The bandpass filter is preferably a Butterworth banpass filter. The temporally bandpassed phases correspond to the motion in a frame. The phased are then multiplied by an amplification factor in order to be amplified.

The video is then reconstructed by using an inverse Fourier transform, and thus the motion enhancement is done.

In other though less preferred embodiments, motion magnification may be carried out by implementing the Phase-Based Eulerian video magnification as disclosed by N. Wadhwa and al. in "Phase-Based Video Motion Processing", *ACM Transactions on Graphics,* 32(4):80, 2013.

Alternatively, Eulerian Video Magnification, as disclosed by H.-Y. Wu et al in "Eulerian video magnification for revealing subtle changes in the world". *ACM Transactions on Graphics,* 31(4):65, 2012, may also be implemented in order to carry out motion magnification.

Other methods may also be implemented such as Lagrangian Motion Magnification, or the methods disclosed by:
Liu C., Torralba A., Freeman W. T., Durand F., and Adelson E. H., 2005. "Motion magnification." ACM Trans. Graph. 24, 519-526, or
WANG, J., DRUCKER, S. M., AGRAWALA, M., AND COHEN, M. F. 2006. "The cartoon animation filter." ACM Trans. Graph. 25, 1169-1173.

Determination of a Liveness Score of the Video

Once the video has been pre-processed, the process further comprises a step 300 of determining, a liveness score of the video.

Preferably, in order to implement this step, each frame of the video may be downscaled 310 to a smaller size. For instance, frames may be downscaled to 100*100 pixels. This allows a quicker processing of the video.

Moreover, for each downscaled frame, motion intensity, which is preferably phase variation between the frames, is normalized to have its values in the range of 0 to 1. Let F be the motion component (for instance the magnified phase variation) of the $j^{th}$ frame of the video. F is the sum of the differences between the pixels of a frame and the corresponding pixels of the previous frame. For instance, in the case where the frames are downscaled to 100*100 pixels:

$$F(j) = \sum_{x=1}^{100} \sum_{y=1}^{100} I_j(x, y) - I_{j-1}(x, y)$$

Where $I_j$ is a $j^{th}$ frame.

The normalized motion component NorF(j) is given by:

$$NorF(j) = \frac{F(j)}{\max(F(j))}$$

Where j=1:N.

Then, for a plurality of frames j, a differential motion intensity 320 of the frame is determined. In the case where motion magnification comprises magnification of the motion intensity, the differential motion intensity is called differential phase variation of a frame. This step will be more detailed with reference to FIG. 2b.

Preferably, the differential motion intensity is computed for at least six frames of the video, and even more preferably for at least ten or eleven frames of the video, as the decision based on the differential motion intensity is more robust with an increasing number or frames, and particularly from the eleventh frame.

Figure 2B:
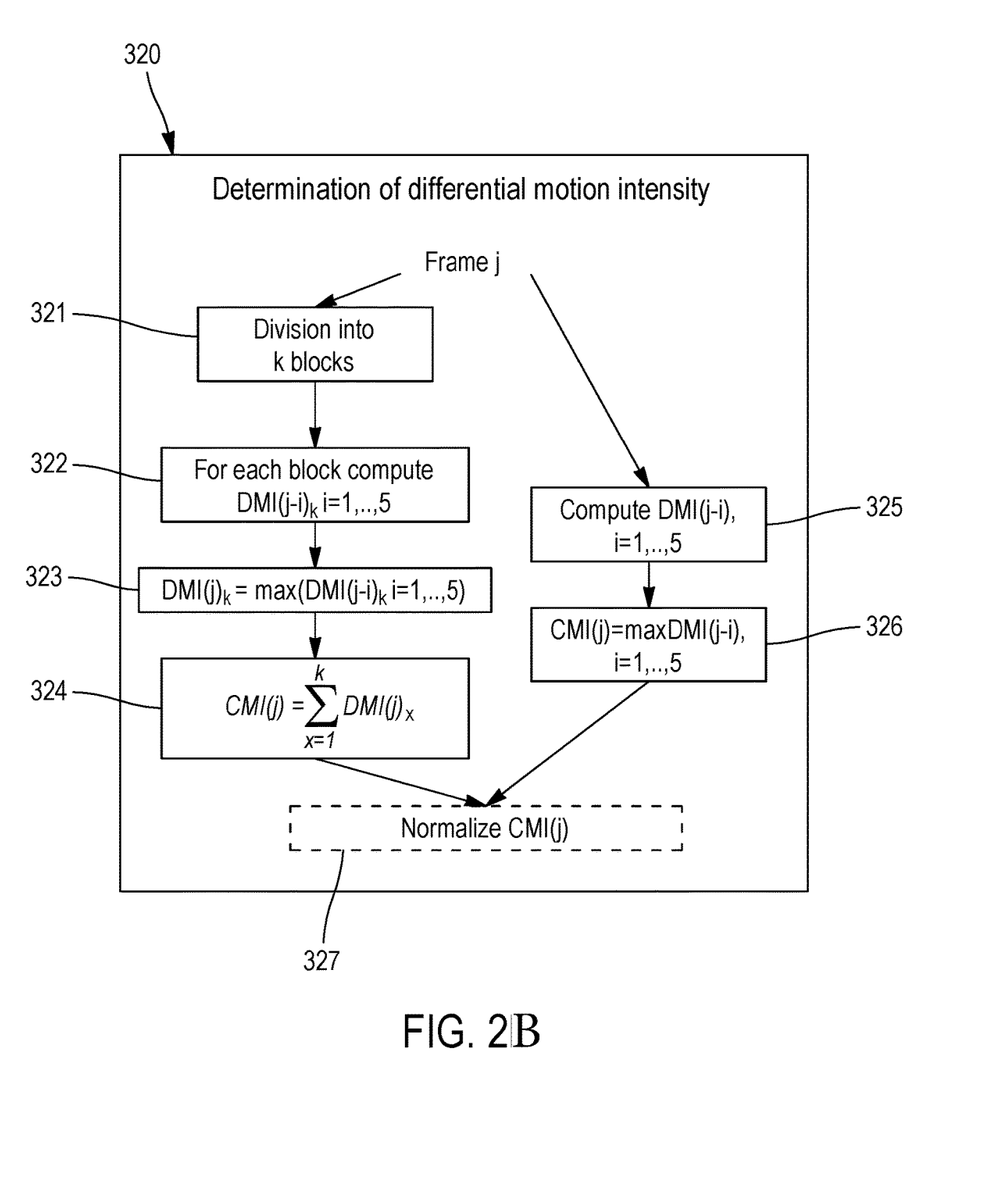
FIG. 2b schematically shows the computation steps of a frame differential phase information.

The determination of differential motion intensity of a frame j comprises computing, for the current frame j, the difference between a motion intensity of the frame j, and a motion intensity of each of a set of frames preceding frame j.

Figure 2C:
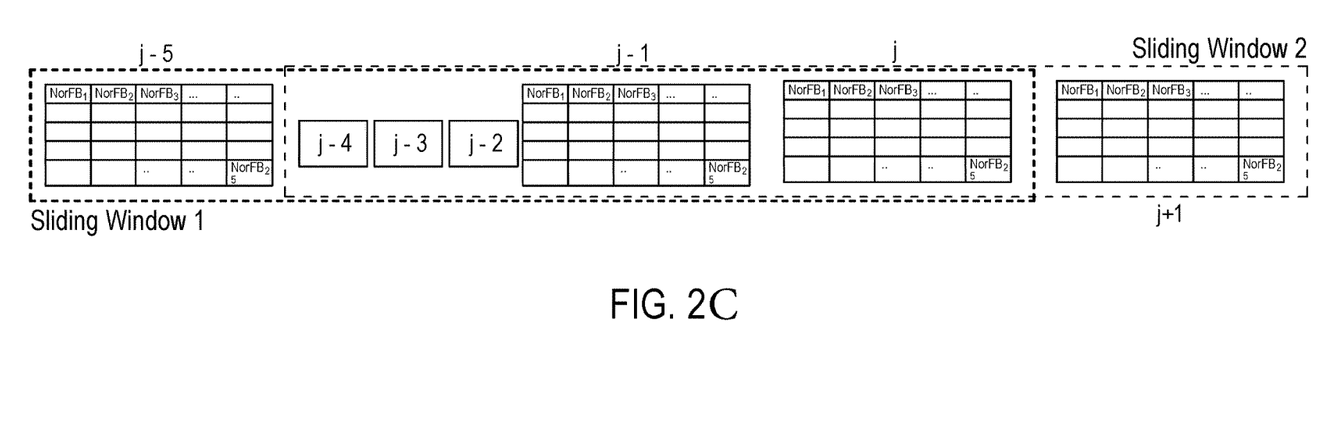
FIG. 2c schematically shows the implementation of the step of computing differential phase information of a frame.

Preferably, as shown in FIG. 2c, the set of frames comprises between three and eight frames, and preferably five frames.

Therefore, in a preferred embodiment, this step is carried out for each frame j from the fifth. The differential motion intensity is computed using a sliding window approach with a window size of five frames (cardinal of the set of frames) and increment by one frame to detect the rate of the change, for instance of phase, with respect to time, that is, for a current frame NorF(j), using the five previous frames NorF(j−1) to NorF(j−5).

The computation 320 of the differential motion intensity of the frame is as follows.

In an embodiment, each frame is first divided 321 into non-overlapping blocks of a specific and constant size, bx*by, as shown for instance in FIG. 2a. Following the above example, the block size may be 20*20 pixels, resulting in a number k of blocks equal to 25.

The motion intensity of a block is further referred as block motion intensity and represented as $NorFB(j)_k$. In a preferred embodiment, the motion intensity of a block is the normalized block phase variation.

Then, a difference 322 in motion intensity between the current frame and each of the set of previous frames is determined by computing, for every block in the current frame, the difference between a motion intensity of the block and a motion intensity of a corresponding block of each of the set of previous frames.

For a particular block k, the differential intensity between the current frame and the set of previous frames is given by:

$DMI(j-5)_k = NorFB(j)_k - NorFB(J-5)_k$ $DMI(j-4)_k = NorFB(j)_k - NorFB(J-4)_k$ $DMI(j-3)_k = NorFB(j)_k - NorFB(J-3)_k$ $DMI(j-2)_k = NorFB(j)_k - NorFB(J-2)_k$ $DMI(j-1)_k = NorFB(j)_k - NorFB(J-1)_k$

For all the k blocks (for instance k=1, 2, . . . , 25).

The differential motion intensity for a particular block k of a frame j is obtained by determining 323 the maximum of all the differences computed at step 322:

$DMI(j)_k = \max\{DMI(j-5)_k, \ldots, DMI(j-1)_k\}$

Then, for a frame, the differential motion intensity of frame j, noted CMI, cumulated for all the blocks of the entire frame j, is obtained in a step 324 by summing all differential motion intensities across all the blocks k in the frame.

$$CMI(j) = \sum_{x=1}^{k} DMI(j)_x$$

The division of the frame into smaller blocks reduces computational requirements for the processing unit.

In another embodiment, the frame may not be divided into blocks, and hence step 320 of differential motion intensity determination may only comprise a step 325 of computing a motion intensity difference between frame j with each of the previous set of frames, and a step 326 of determining the differential motion intensity of frame j as the maximum motion intensity difference computed at step 322'. In this embodiment, there is no intermediate step as the frame is not divided into blocks.

Preferably, the differential motion intensity obtained at step 324 or 326 is further normalized during a step 327, so that it can then be compared to a common threshold.

In order to normalize the differential motion intensity, a single sided logistic or sigmoid function is preferably applied. The normalized differential motion intensity for a frame j is noted NCMI(j). In the case of the use of a single-sided sigmoid function, NCMI(j) is expressed as follows:

$$NCMI(j) = \frac{1}{1 + \exp^{-CMI(j)}}$$

In this example The obtained normalized differential motion intensity ranges between 0.5 and 1 given the use of the single sided sigmoid function.

Then, a motion intensity of the video is inferred from the normalized differential motion intensity of the frames during a step 330. The motion intensity of the video is preferably a phase variation of the video, in the case where the differential motion intensity of a frame is a differential phase variation.

The motion intensity of the video is preferably obtained by computing the mean normalized differential motion intensity m(NCMI(j)) of the frames, preferably over the six or more frames, and even more preferably over the ten or more frames for which the differential motion intensity of the frames has been computed at step 320.

Last, the liveness score of the frame j is obtained by comparing 340 the motion intensity of the video, for instance the phase variation of the video, to a predetermined threshold indicated as Th. The value of this threshold can be determined empirically based on a database of spoof videos.

For a replay video attack, the recording of a replay video comprises more frequency components than a genuine recording of a live biometric characteristic. For this reason, the mean normalized differential motion intensity should be higher for a replay video attack than for a genuine recording.

Hence, if the mean normalized differential motion intensity is higher than the predetermined threshold, the video is considered as being a replay attack video and the liveness score LS is set to 0.

In an embodiment, if the mean normalized differential motion intensity is lower than the threshold Th, the video is considered as being a genuine recording of a biometric characteristic, and the liveness score LS is set to 1.

This embodiment is summed up as follows:

$$LS(j) = \begin{cases} 1, & \text{if } m(NCMI(j)) \leq Th \\ 0, & \text{otherwise} \end{cases}$$

In an alternate embodiment, the normalized differential motion intensity can be compared to another threshold Th', which is lower than the first Th, and corresponds to a threshold below which the frame is considered as pertaining to a recording of a picture (print attack).

Indeed, such videos would have different motion information, and in particular different phase variation than the live presentation of the individuals.

In that case, in the mean normalized differential motion intensity is below the second threshold Th', the video is considered as being a print attack video and the liveness score is set to 0. If the mean normalized differential motion intensity is between the first and second thresholds Th, Th', the video is considered as being a genuine recording of a live biometric characteristic and the liveness score LS is set to 1.

This is summarized as follows:

$$LS(j) = \begin{cases} 1, & \text{if } Th' \leq m(NCMI(j)) \leq Th \\ 0, & \text{otherwise} \end{cases}$$

Once the step of determining a liveness score has been carried out, a decision 400 is made as to the authenticity of the whole video.

The decision based on at least ten or eleven frames has shown great precision and a low error amount. Therefore the above technique makes it possible to differentiate between spoof and genuine videos, even with a processing unit having relatively low computational capacity, such as a processor of a smartphone.

The invention claimed is:

1. A process for determining a video of a biometric characteristic as being a spoof or a genuine recording of a live biometric characteristic, wherein the video comprises a temporal sequence of frames (j), the process being implemented in a system comprising a processing unit, characterized in that it comprises the steps of:
   preprocessing the video, said preprocessing comprising aligning the biometric characteristic on each frame of the video,
   determining a liveness score of the video, said determination comprising, for each frame of a plurality of frames:
      computing a difference between a motion intensity of a current frame and a motion intensity of each frame of a set of preceding frames,
      inferring, from said differences, a differential motion intensity of the current frame,
      inferring from the differential motion intensities of the plurality of frames a motion intensity of the video,
      comparing said motion intensity to a predetermined threshold, and assigning a liveness score to the video, depending on a comparison of the motion intensity of the video with the threshold, and according to the liveness scores of the video, determining whether the video is a genuine recording of a biometric characteristic or a spoof.

2. The process according to claim 1, wherein the motion intensity of a frame comprises phase variation of the frame, and motion intensity of the video comprises phase variation of the video.

3. The process according to claim 1, wherein motion intensity of the video is inferred from differential motion intensities of at least ten frames of the video.

4. The process according to claim 1, wherein the set of frames for computation of the motion intensity difference with the current frame comprises from three to eight frames, and preferably five frames preceding the current frame.

5. The process according to claim 1, wherein each frame is divided into non-overlapping blocks of constant size, and the computation of the difference in motion intensity between two frames is carried out by computing, for every block in the current frame, the difference between a motion intensity of the block and a motion intensity of a corresponding block of each of the set of previous frames,
and the differential motion intensity of the current frame is obtained by:
electing, for each block of the current frame, the maximum motion intensity difference between said block and the corresponding block of each of the set of previous frames, and
summing the maximum motion intensities of all the blocks in the frame.

6. The process according to claim 1, wherein the preprocessing step further comprises a step of magnifying the motion in the video.

7. The process according to claim 6, wherein the motion magnification is a phase-variation magnification and comprises:
decomposing the video using a Fast Fourier Transform,
applying a bandpass filter to the phase,
applying an amplification factor to at least some phase components, and
implementing an inverse Fourier Transform to reconstruct the video.

8. The process according to claim 1, wherein the biometric characteristic on the video is an iris, and the preprocessing of the video comprises selecting frames of the video to remove blinks of the eye.

9. The process according to claim 1, further comprising comparing the motion intensity of the video to a second threshold, and the step of assigning a liveness score to the video depends on the comparison of the motion intensity with the two thresholds.

10. The process according to claim 1, wherein the differential motion intensity of each frame is further normalized by applying a sigmoid function to said differential motion intensity.

11. The process according to claim 10, wherein the motion intensity of the video is a mean of the normalized differential intensities, and said motion intensity is compared to the first threshold and, if said motion intensity exceeds said threshold, the video is considered as being a spoof of the replay video type, and the liveness score assigned to the frame is 0.

12. The process according to claim 10, further comprising comparing the motion intensity of the video to a second threshold, and the step of assigning a liveness score to the video depends on the comparison of the motion intensity with the two thresholds, wherein the second threshold is lower than the first threshold, the motion intensity of the video is compared to the second threshold, and, if below said threshold, the video is considered as being a spoof of the print type and the liveness score assigned to the frame is 0.

13. A non-transitory computer-readable medium comprising a memory storing program code instructions adapted to make a computer performing the process according to any of the preceding claims when implemented by a processing unit.

14. A processing unit configured to implement the process according to claim 1.

15. An authentication or identification system, comprising a processing unit according to claim 14 and a video camera adapted to acquire a video of a biometric characteristic, and to transfer said video to the processing unit.

* * * * *